Nov. 13, 1934.  A. S. THOMPSON  1,980,559
VEHICLE BODY CONSTRUCTION
Filed March 5, 1934
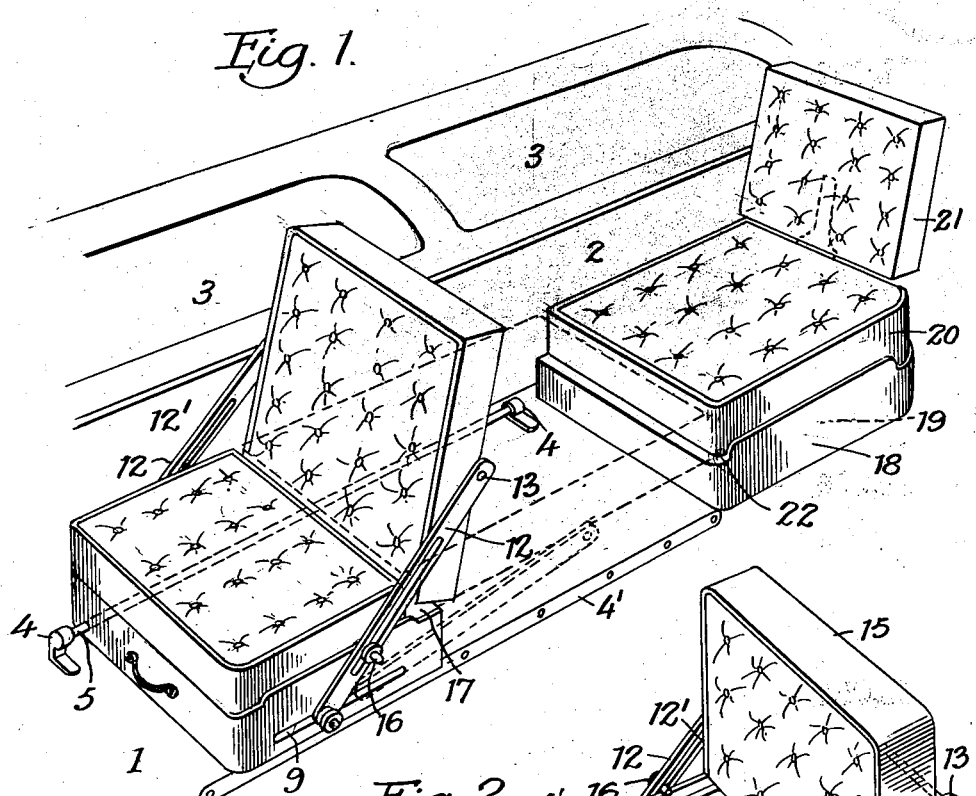
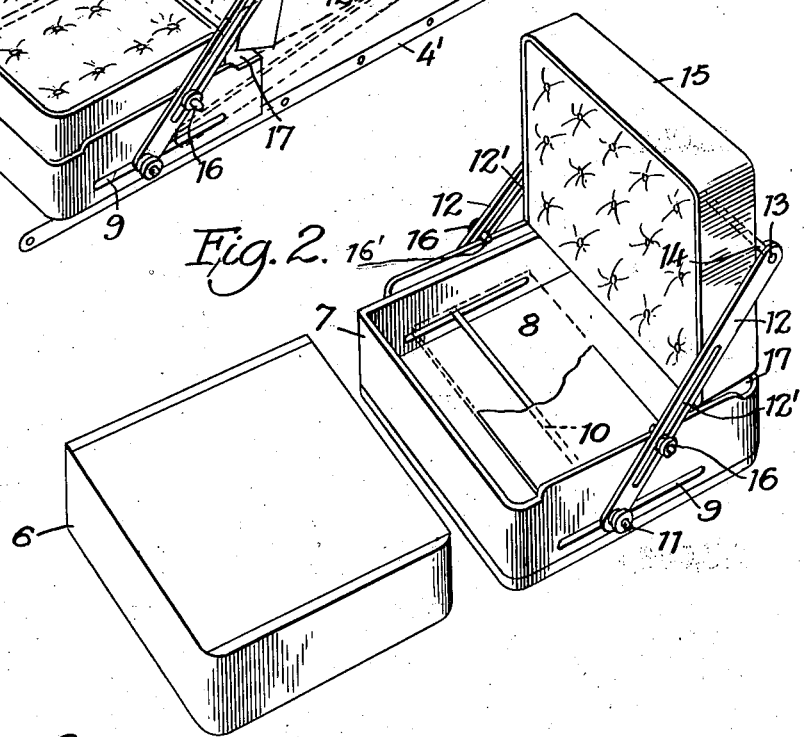
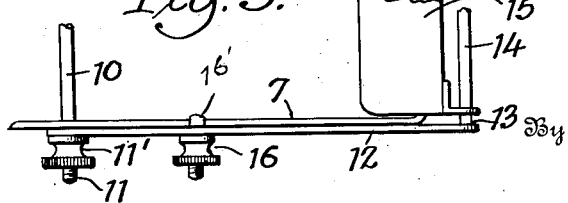
Inventor
Arthur S. Thompson
By
Attorney Patented Nov. 13, 1934

1,980,559

UNITED STATES PATENT OFFICE 1,980,559

VEHICLE BODY CONSTRUCTION

Arthur S. Thompson, Ontario, Calif.

Application March 5, 1934, Serial No. 714,134

2 Claims. (Cl. 155—7)

My invention relates to improvements in vehicle body construction, and the invention particularly covers a combined bed, seats and apparel receptacle for use in motor vehicles.

One object of my invention is the provision of a combination bed, seats and apparel receptacle which will perform the threefold functions in a most thorough and satisfactory manner and which improvements can be quickly adapted and adjusted for the desired purpose.

Another object of my invention is the provision of an improvement of the character and for the purposes stated which will prove particularly useful in touring cars of any capacity where it is necessary to adjust the parts for use as a bed, seats, or for the storage and carrying of apparel.

Another object of my invention is the provision of a combination bed, seats and apparel receptacles which may be quickly adjusted for the desired purpose, which will be of compact, simple and durable construction, which will insure perfect comfort as a bed or chairs and provide ample space for carrying apparel, and which can be produced at a low price, thus embodying every requisite to provide an efficient, useful and practical invention of this character.

With these objects in view my invention consists of a combination bed, seats and apparel receptacles embodying novel features of construction and combination of parts, substantially as described and claimed herein and as shown in the accompanying drawing, in which:

Figure 1 represents a perspective view of a combined bed, seats, and apparel receptacles constructed in accordance with and embodying my invention, two seats being shown in full lines in position for use and the bed being shown in dotted lines.

Figure 2 represents a perspective view of the seat member whose hinged back when lowered forms a section of the bed, with its seat portion being removed to show the apparel case or receptacle, and Figure 3 represents a detail view of the means carried by the front seat member for adjusting its back portion in providing a seat and bed.

In the drawing is shown only a construction employing a bed and two seats and only one half or one side of the complete improvement for the purpose of illustration is shown, and in the drawing the numeral 1 designates the floor of the body and 2 designates one side provided with windows 3.

In the invention shown provision is made for only a pair of seats and a bed which may provide both for sleeping and seating accommodations, but it will be understood that any number of seats and beds may be provided according to the size of the vehicle and its seating and sleeping requirements.

Mounted upon the floor of the body adjacent its side are the pair of brackets 4, in which is secured the rod 5, which forms the guiding and securing means for the front member which is adapted to form the front seat and also to provide the mattress section, and this member comprises the seat section 6, and a supporting frame preferably formed as an open box or casing 7, on which said seat section fits and providing beneath the seat section a receptacle 8 for clothes or wearing apparel. The box or casing is provided in its sides with the pair of slots 9, in which fits the ends of the rod 10, and the threaded ends 11, of said rod pass through the lower ends of the pair of links 12, whose upper ends are connected at 13, to the ends of the rod 14, secured to the back of the hinged section 15, and said links are provided with a slot 12', in which is engaged the clamping element 16, secured to the box or casing and which it will be seen allows the section 15, to be arranged to form a back for the seat, or to be lowered to the position shown in dotted lines in Figure 1, to provide a section of the bed or mattress, the box or casing being provided with a cutaway portion 17 to form a rest or bearing for the front end of the section 15 when lowered to bed forming position, as shown in dotted lines in Fig. 1.

The said links 12, are provided with a slot 12', in which fits the studs 16', carried by the clamps or binding screws 16, and this construction allows the studs 16', which fit in the slots 12', and slide therein to be placed at any point in the slots and to be clamped thereto to adjust the angle of the section 15, as said studs 16', rest upon the upper edge of the box or casing and serve to support the section 15, or the clamps with their stud may be moved to the upper end of the slots 12', and allow the said section to descend and rest upon the shoulder 22, of the rear casing and thus form a complete bed. Also the rod 10, may be slid back and forth in the slots 9, to permit access to the compartment 8, all as evident from the drawing and description.

This construction described is directed to the front member of my invention and the rear or companion member comprises a box or casing 18, which also provides a case or receptacle 19, for wearing apparel and also receives the seat or bed section 20, which carries the back rest 21, which may be adjustable if desired, and which may also provide a head rest, and this box or case is also formed with the forward recess 22, upon which the hinged section 15, is supported when the parts are adjusted to form a bed.

From the foregoing description taken with the drawing it will be understood that my invention can be used in vehicles of any desired size or capacity and will provide a combination of bed, seats and apparel case or receptacles in a most novel and satisfactory manner, and that the improvements embody a simple, durable, inexpensive and practical construction.

I claim:

1. In vehicle body construction, means forming seating and sleeping accommodations, comprising front and rear frames in the from of open boxes or casings, a seat section in the rear open casing, a back rest associated with said seat, a seat section fitted in the front open casing, a back rest having adjustable connection with the open casing to allow said back rest to function as a back rest or as a bed section, said adjustable connection comprising a pair of longitudinal slots in the side walls of the said open casing, a rod passing through said slots and adjustable longitudinally therein, a pair of links having their upper ends connected with the back rest and their lower ends connected with the ends of said rod, slots in said links, and members adjustable in said slots and provided with means to clamp the same in the adjusted position along said slots, said members being formed with a stud to rest upon the upper edge of the side walls of the open casing to retain the back rest in the desired adjustment.

2. In vehicle body construction, means for providing seating and sleeping accommodations, comprising front and rear open casings, seats in said front and rear casings, a rigid back rest associated with the rear open casing and seat, said front casing having a longitudinal slot in each of its side walls, a rod having its ends passing through said slots, an adjustable back rest for said front casing, a pair of slotted links having their upper ends pivotally connected with said back rest and their lower ends connected with the projected ends of said rod, and studs adjustable in the slots of said links and means to clamp said studs in position along said slots, said studs having a portion engaging the upper edge of the sides of the casing to retain the back rest in desired adjustment, and means connected with said front open casing to allow it to have a sliding movement.

ARTHUR S. THOMPSON.